(12) United States Patent
Gupta et al.

(10) Patent No.: US 8,136,942 B2
(45) Date of Patent: Mar. 20, 2012

(54) ASPHERIC FLUID FILLED LENS OPTIC

(75) Inventors: Amitava Gupta, Roanoke, VA (US); Urban Schnell, Münchenbuchsee (CH); Karim Haroud, Chavannes sur Moudon (CH); Hans Jaeger, Thunstetten (CH)

(73) Assignee: Adlens Beacon, Inc., Iselin, NJ (US)

( * ) Notice: Subject to any disclaimer, the term of this patent is extended or adjusted under 35 U.S.C. 154(b) by 72 days.

(21) Appl. No.: 12/579,203

(22) Filed: Oct. 14, 2009

(65) Prior Publication Data
US 2011/0085131 A1    Apr. 14, 2011

(51) Int. Cl.
  G02C 7/02    (2006.01)
  G02B 3/12    (2006.01)
(52) U.S. Cl. .................. 351/159; 351/176; 359/665
(58) Field of Classification Search .................. 351/159, 351/176; 359/665–667
See application file for complete search history.

(56) References Cited

U.S. PATENT DOCUMENTS

| | | | |
|---|---|---|---|
| 2,576,581 A | 11/1951 | Edwards |
| 2,836,101 A | 5/1958 | De Swart |
| 2,976,766 A | 3/1961 | Bianchi |
| 3,598,479 A | 8/1971 | Wright |
| 3,614,215 A | 10/1971 | Mackta |
| 4,181,408 A | 1/1980 | Senders |
| 4,477,158 A | 10/1984 | Pollock et al. |
| 4,890,903 A | 1/1990 | Treisman et al. |
| 4,913,536 A | 4/1990 | Barnea |
| 5,080,476 A | 1/1992 | Monin |
| 5,138,494 A | 8/1992 | Kurtin |
| 5,182,585 A | 1/1993 | Stoner |
| 5,229,885 A | 7/1993 | Quaglia |
| 5,371,629 A | 12/1994 | Kurtin et al. |
| 5,440,357 A | 8/1995 | Quaglia |
| 5,515,203 A | 5/1996 | Nye |
| 5,563,528 A | 10/1996 | Diba et al. |
| 5,574,598 A | 11/1996 | Koumura et al. |
| 5,636,368 A | 6/1997 | Harrison et al. |
| 5,668,620 A | 9/1997 | Kurtin et al. |
| 5,684,637 A | 11/1997 | Floyd |
| 5,719,397 A | 2/1998 | Hallett et al. |

(Continued)

FOREIGN PATENT DOCUMENTS
WO    WO 2008/063442 A1    5/2008

OTHER PUBLICATIONS

Borish, I.M., *Clinical Refraction*, 3rd Edition, Chapter 26 (pp. 1051-1113), The Professional Press, Inc., Chicago (1970).

(Continued)

*Primary Examiner* — Jordan Schwartz
(74) *Attorney, Agent, or Firm* — Sterne, Kessler, Goldstein & Fox P.L.L.C.

(57) ABSTRACT

A non-round fluid lens assembly includes a non-round rigid lens and a flexible membrane attached to the non-round rigid lens, such that a cavity is formed between the non-round rigid lens and the flexible membrane. A reservoir in fluid communication with the cavity allows a fluid to be transferred into and out of the cavity so as to change the optical power of the fluid lens assembly. In an embodiment, a front surface of the non-round rigid lens is aspheric. Additionally or alternatively, a thickness of the flexible membrane may be contoured so that it changes shape in a spheric manner when fluid is transferred between the cavity and the reservoir.

9 Claims, 8 Drawing Sheets

U.S. PATENT DOCUMENTS

| | | | |
|---|---|---|---|
| 5,731,909 A | 3/1998 | Schachar |
| 5,739,959 A | 4/1998 | Quaglia |
| 5,774,273 A | 6/1998 | Bornhorst |
| 5,790,882 A | 8/1998 | Silver et al. |
| 5,900,921 A | 5/1999 | Min |
| 5,952,846 A | 9/1999 | Silver |
| 5,956,183 A | 9/1999 | Epstein et al. |
| 5,963,048 A | 10/1999 | Harrison et al. |
| 5,973,852 A | 10/1999 | Task |
| 5,999,328 A | 12/1999 | Kurtin et al. |
| 6,040,947 A | 3/2000 | Kurtin et al. |
| 6,053,610 A | 4/2000 | Kurtin et al. |
| 6,069,742 A | 5/2000 | Silver |
| 6,091,892 A | 7/2000 | Xue et al. |
| 6,188,525 B1 | 2/2001 | Silver |
| 6,246,528 B1 | 6/2001 | Schachar |
| 6,493,151 B2 | 12/2002 | Schachar |
| 6,552,860 B1 | 4/2003 | Alden |
| 6,618,208 B1 | 9/2003 | Silver |
| 6,626,532 B1 | 9/2003 | Nishioka et al. |
| 6,715,876 B2 | 4/2004 | Floyd |
| 6,836,374 B2 | 12/2004 | Esch et al. |
| 6,930,838 B2 | 8/2005 | Schachar |
| 6,992,843 B2 | 1/2006 | Juhala |
| 7,068,439 B2 | 6/2006 | Esch et al. |
| 7,085,065 B2 | 8/2006 | Silver |
| 7,142,369 B2 | 11/2006 | Wu et al. |
| 7,256,943 B1 | 8/2007 | Kobrin et al. |
| 7,261,736 B1 | 8/2007 | Azar |
| 7,324,287 B1 | 1/2008 | Gollier |
| 7,325,922 B2 | 2/2008 | Spivey |
| 7,338,159 B2 | 3/2008 | Spivey |
| 7,342,733 B2 | 3/2008 | Takei |
| 7,369,321 B1 | 5/2008 | Ren et al. |
| 7,382,544 B2 | 6/2008 | Cernasov |
| 7,423,811 B2 | 9/2008 | Silver |
| 7,440,193 B2 | 10/2008 | Gunasekaran et al. |
| 7,453,646 B2 | 11/2008 | Lo |
| 7,475,985 B2 | 1/2009 | Blum et al. |
| 7,580,195 B2 | 8/2009 | Choi et al. |
| 7,580,197 B2 | 8/2009 | Omura et al. |
| 7,594,726 B2 | 9/2009 | Silver |
| 7,604,349 B2 | 10/2009 | Blum et al. |
| 2004/0001180 A1* | 1/2004 | Epstein ......................... 351/159 |
| 2004/0240076 A1 | 12/2004 | Silver |
| 2005/0140922 A1 | 6/2005 | Bekerman et al. |
| 2006/0066808 A1 | 3/2006 | Blum et al. |
| 2006/0077562 A1 | 4/2006 | Silver |
| 2006/0164731 A1 | 7/2006 | Wu et al. |
| 2006/0245071 A1 | 11/2006 | George et al. |
| 2006/0250699 A1 | 11/2006 | Silver |
| 2007/0030573 A1 | 2/2007 | Batchko et al. |
| 2007/0211207 A1 | 9/2007 | Lo et al. |
| 2008/0002150 A1 | 1/2008 | Blum et al. |
| 2008/0007689 A1 | 1/2008 | Silver |
| 2008/0008600 A1 | 1/2008 | Silver |
| 2008/0019015 A1 | 1/2008 | Fernandez et al. |
| 2008/0084532 A1 | 4/2008 | Kurtin |
| 2008/0112059 A1 | 5/2008 | Choi et al. |
| 2008/0218873 A1 | 9/2008 | Batchko et al. |
| 2008/0231963 A1 | 9/2008 | Batchko et al. |
| 2008/0285143 A1 | 11/2008 | Batchko et al. |
| 2008/0316587 A1 | 12/2008 | Tijburg et al. |
| 2009/0021843 A1 | 1/2009 | Obrebski et al. |
| 2009/0052049 A1 | 2/2009 | Batchko et al. |
| 2009/0086331 A1 | 4/2009 | Gunasekaran et al. |
| 2009/0116118 A1 | 5/2009 | Frazier et al. |
| 2009/0128922 A1 | 5/2009 | Justis et al. |
| 2009/0195882 A1 | 8/2009 | Bolle et al. |
| 2009/0213471 A1 | 8/2009 | Silver et al. |
| 2009/0251792 A1 | 10/2009 | Suzuki et al. |
| 2010/0045930 A1 | 2/2010 | Silver et al. |
| 2010/0053543 A1 | 3/2010 | Silver et al. |
| 2010/0208194 A1 | 8/2010 | Gupta et al. |
| 2010/0208195 A1 | 8/2010 | Gupta et al. |

OTHER PUBLICATIONS

Jalie, M., *The Principles of Ophthalmic Lenses*, 4th Edition, Chapter 18 (pp. 413-468), The Association of Dispensing Opticians, Hazell Watson & Viney Limited, London (1984).

Markoff, J., "Scientists At Work: Stephen Kurtin—Making Eyeglasses That Let Wearers Change Focus on the Fly," *The New York Times*, 3 pages (Aug. 4, 2009).

Tang, S.K.Y. et al., "Dynamically Reconfigurable Liquid-Core Liquid-Cladding Lens in a Microfluidic Channel," *Lab on a Chip*, vol. 8, No. 3, p. 395-401 (Mar. 2008).

International Search Report and Written Opinion, dated Dec. 2, 2010, for PCT Appl. No. PCT/US2010/052367, 12 pages.

Gupta, A. et al., U.S. Appl. No. 12/848,910, filed Aug. 2, 2010, entitled "Non-Round Fluid Filled Lens Optic,".

Gupta, A. et al., U.S. Appl. No. 12/855,465, filed Aug. 12, 2010, entitled "Fluid-Filled Lenses and their Opthalmic Applications,".

Senatore, D. et al., U.S. Appl. No. 12/904,720, filed Oct. 14, 2010, entitled "Fluid Filled Lenses and Mechanisms of Inflation Thereof,".

Gupta, A. et al., U.S. Appl. No. 12/904,736, filed Oct. 14, 2010, entitled "Fluid Filled Lens Reservoir System and Manufacturing Method of the Reservoir System,".

Senatore, D. et al., U.S. Appl. No. 12/904,769, filed Oct. 14, 2010, entitled "Hinge Mechanism for a Fluid Filled Lens Assembly,".

Senatore, D. et al., U.S. Appl. No. 13/000,887, filed Dec. 22, 2010, entitled "Fluid Filled Lenses and Mechanisms of Inflation Thereof,".

* cited by examiner

ASPHERIC FLUID FILLED LENS OPTIC

BACKGROUND

1. Field

Embodiments of the present invention relate to fluid-filled lenses, in particular variable fluid-filled lenses.

2. Related Art

Basic fluid lenses have been known since about 1958, as described in U.S. Pat. No. 2,836,101, incorporated herein by reference in its entirety. More recent examples may be found in "Dynamically Reconfigurable Fluid Core Fluid Cladding Lens in a Microfluidic Channel," Tang et al., *Lab Chip*, 2008, vol. 8, p. 395, and in WIPO publication WO2008/063442, each of which is incorporated herein by reference in its entirety. These applications of fluid lenses are directed towards photonics, digital telephone and camera technology, and microelectronics.

Fluid lenses have also been proposed for ophthalmic applications. (See, e.g., U.S. Pat. No. 7,085,065, incorporated herein by reference in its entirety.) In all cases, the advantages of fluid lenses—including a wide dynamic range, ability to provide adaptive correction, robustness, and low cost—have to be balanced against limitations in aperture size, tendency to leak, and consistency in performance. The '065 patent, for example, has disclosed several improvements and embodiments directed towards effective containment of the fluid in the fluid lens to be used in ophthalmic applications. Power adjustment in fluid lenses has been effected by injecting additional fluid into a lens cavity, by electrowetting, by application of ultrasonic impulse, and by utilizing swelling forces in a cross-linked polymer upon introduction of a swelling agent to the lens fluid, such as water.

In all cases, there are several key limitations in current fluid lens technology that need to be overcome to optimize the commercial appeal of this technology. For example, the thickness of fluid lenses is generally greater than conventional lenses of the same power and diameter. Additionally, it is not currently possible to provide a variation of spherical power as well as astigmatism across the lens optic using fluid lens technology. Nor is it currently possible to make fluid lenses in any desired shape other than a round shape because of complications introduced in non-uniform expansion of non-round fluid lenses.

BRIEF SUMMARY

In an embodiment of the present invention, a non-round fluid lens assembly includes a non-round rigid lens and a flexible membrane attached to the non-round rigid lens, such that a cavity is formed between the non-round rigid lens and the flexible membrane. A reservoir in fluid communication with the cavity allows a fluid to be transferred into and out of the cavity so as to change the optical power of the fluid lens assembly. In an embodiment, a front surface of the non-round rigid lens is aspheric. Additionally or alternatively, a thickness of the flexible membrane may be contoured so that it changes shape in a spheric manner when fluid is transferred between the cavity and the reservoir.

Additionally or alternatively, the flexible membrane may have an "inset" portion that is more flexible than other portions of the flexible membrane, such that transfer of the fluid between the cavity and the reservoir causes the shape of the inset portion to change in a spherical manner without substantially changing portions of the flexible membrane other than the inset portions. In an embodiment, the inset portion is elliptical in shape. The inset portion may be contoured so that it changes shape in a spheric manner when fluid is transferred between the cavity and the reservoir. Including such an inset portion in the flexible membrane allows a non-round lens (e.g., an oval-shaped, rectangular-shaped, or other-shaped lens that may be preferred by a wearer) to be worn while maintaining the advantages of a fluid-filled lens.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 5A:
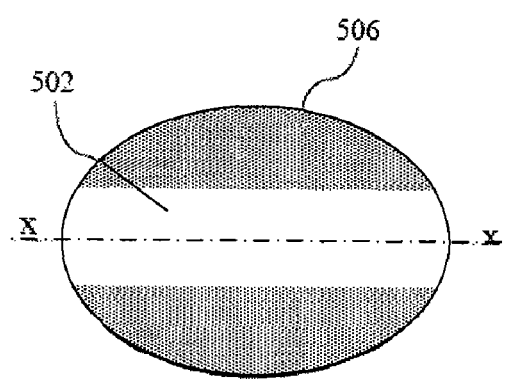

FIGS. 5a,b and 6a,b illustrate contoured flexible membranes, according to embodiments of the present invention.

Figure 7A:
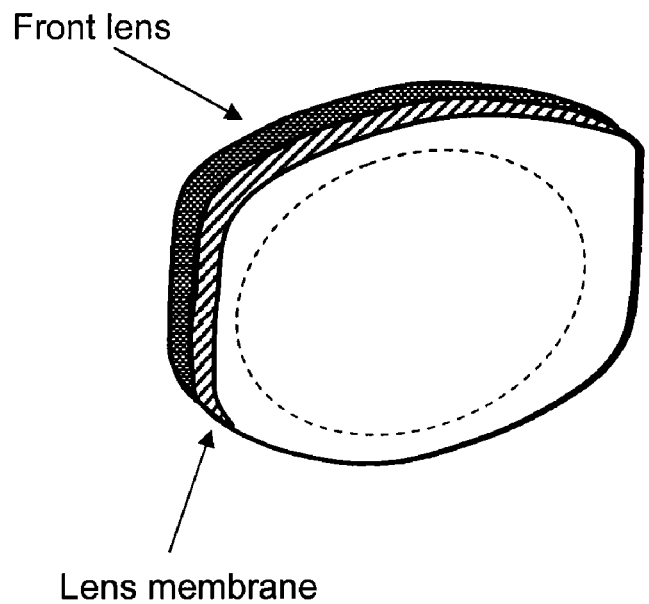

FIG. 7a,b illustrate an exemplary elliptical inset in a fluid lens assembly, according to an embodiment of the present invention.

Figure 8A:
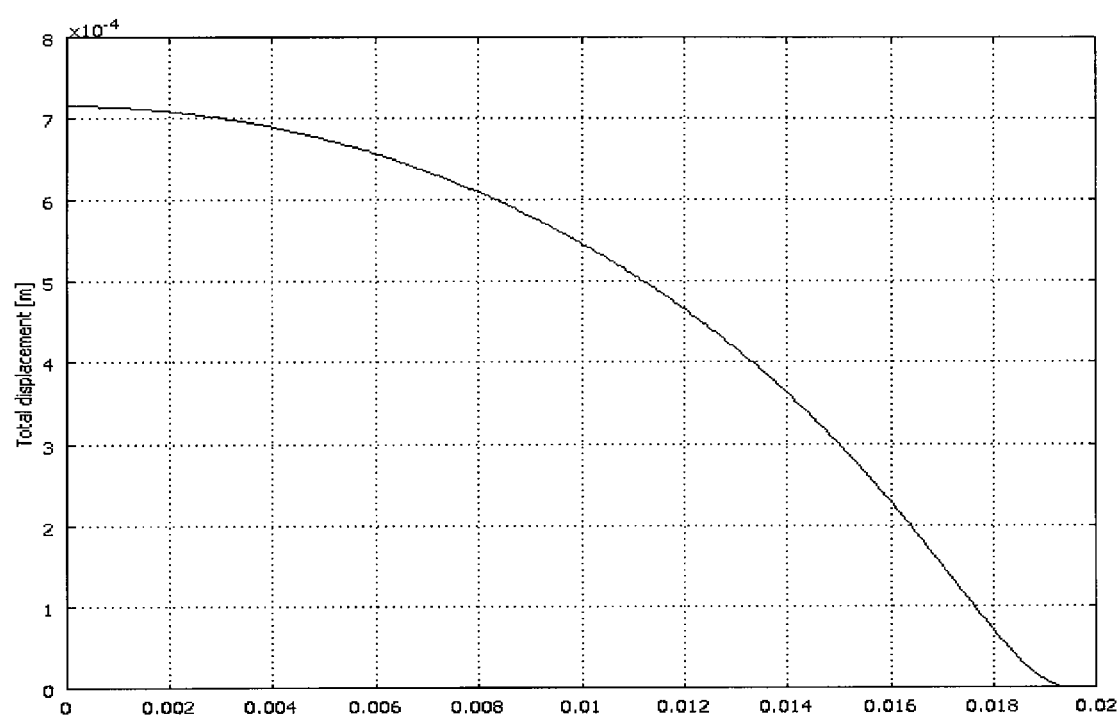

FIG. 8a,b illustrate deformation of a flexible membrane in a fluid lens, according to an embodiment of the present invention The present invention will be described with reference to the accompanying drawings. The drawing in which an element first appears is typically indicated by the leftmost digit(s) in the corresponding reference number.

DETAILED DESCRIPTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

Figure 1:
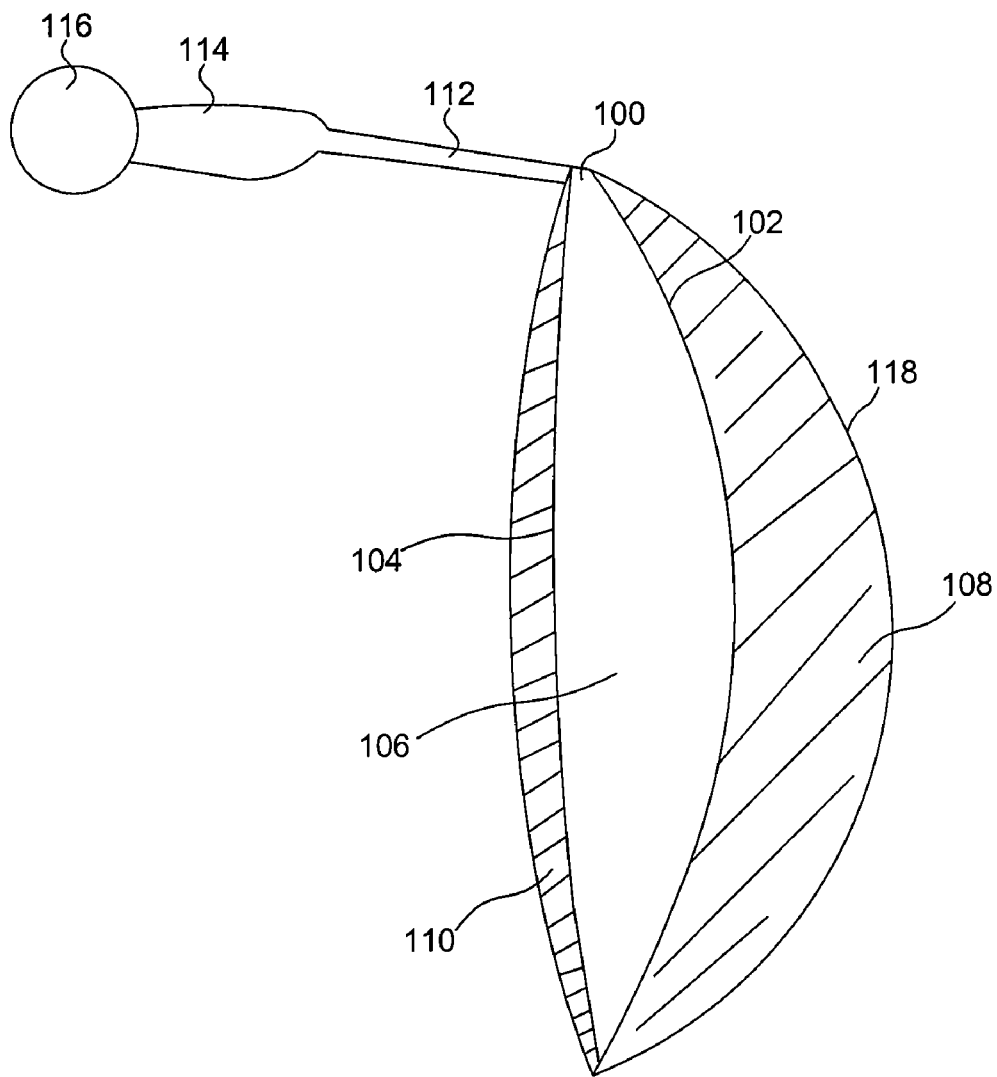
FIG. 1 is a diagram of an exemplary fluid-filled lens assembly, according to an embodiment of the present invention.

The limitations of previously-available fluid-filled lens technology described in the Background section above may be removed by constructing an aspheric fluid lens. Previous fluid lenses have always been round in shape, since no method existed to construct an aspheric fluid lens. FIG. 1 illustrates an exemplary aspheric fluid lens 100 according to an embodiment of the present invention. Fluid lens 100 includes a rigid front surface 118, a flexible back surface 104, and a fluid filling the cavity 106 formed between front surface 118 and back surface 104. Rigid front surface 118 may be provided by a rigid optical lens 108 made of, for example, glass or plastic. Flexible back surface 104 may be provided by, for example, a flexible membrane 110 stretched flat over the edge of rigid optical lens 108. The fluid lens formed thereby is connected via a channel 112 to a reservoir 114 lined or otherwise formed from with an elastomeric deformable membrane that contains excess fluid. Fluid lens 100 and reservoir 114 together form a sealed unit. An actuator 116 is operable to squeeze or expand the deformable membrane inside the reservoir to transfer fluid between reservoir 114 and fluid lens 100 through channel 112. Actuator 116 may be, for example and without limitation, a bulb actuator, a syringe-type actuator, or a dial actuator. In embodiments, neither, either, or both of rigid optical lens 108 and flexible membrane 110 can have optical power. Channel 112, connecting fluid lens 100 to reservoir 114, may be housed, for example, in the eye piece of an eyeglass frame or temple pieces of an eyeglass frame.

Throughout this disclosure, the term "fluid lens assembly" will be used to describe the assembly of rigid front lens 108, flexible membrane 110, and the intervening fluid transfer system including channel 112 and reservoir 114. The term "fluid lens" will be used to denote the fluid layer and the two surfaces 102 and 104 containing the fluid and forming the surfaces of the fluid lens.

In non-round fluid lenses, the pressure of the fluid causes different deflections of the flexible membrane along its short and long axes, and thus produces a non-spherical deflection of the membrane. Non-round fluid lenses of embodiments of the present invention therefore correct for the astigmatism created by this deflection. In one embodiment, the front surface of the rigid front lens corrects for the astigmatism caused by the fluid. Additionally or alternatively, a thickness of the flexible membrane may be contoured so as to effect a spherical deflection of the membrane in response to fluid pressures. In an embodiment, the flexible membrane includes an inset portion that is more flexible than other portions of the flexible membrane, such that transfer of the fluid between the cavity and the reservoir causes the shape of the inset portion to change in a spherical manner without substantially changing portions of the flexible membrane other than the inset portions.

Aspherization of the Front Lens

A fluid lens, such as fluid lens 100, may be rendered aspheric by providing an aspheric front (rigid) lens. Since front lens 108 is in contact with the fluid at its back surface 102, the impact of adding aspheric correction to back surface 102 of front lens 108 will be attenuated by the refractive index of the fluid relative to the refractive index of the front lens material. Indeed, the change in the thickness of front lens 108 needed to provide an aspheric correction through back surface 102 may be expressed as:

$$d = d_1 \frac{n_1 - 1}{n_1 - n_2} \quad \text{(Eq. 1)}$$

in which d is the local change in thickness of the front lens required to provide a particular change in optical power at that point, $d_1$ is the change in thickness that would be necessary if the fluid had been air, $n_1$ is the refractive index of the front lens material and $n_2$ is the refractive index of the fluid. For example, if front lens 108 is made of Polycarbonate of bisphenol A and the fluid is silicone oil, then $n_1$ is 1.59 and $n_2$ is 1.54, resulting in d equal to 11.8 $d_1$. In other words, a relatively large variation in lens thickness will be required to provide an aspheric correction, if that correction is added to back surface 102 of front lens 108.

Lens thickness may be reduced by adding an aspheric correction to a front surface 118 of front lens 108, front surface 118 being in contact with air. The aspheric correction to front surface 118 may be in the form of rotationally symmetrical aspheric correction, rendering the surface of rigid lens 108 ellipsoidal or hyperboloidal. In this case, the surface may be described by Eq. 2, in which the surface is ellipsoidal if p is positive, and hyperboloidal if p is negative:

$$X = \frac{y^2}{r_0 + \sqrt{(r_0^2 - py^2)}} \quad \text{(Eq. 2)}$$

Rotationally symmetric aspheric corrections applied to front surface 118 of rigid lens 108 provide at least two benefits. Aspheric corrections may be designed to minimize spherical aberration present in the fluid lens that may be especially noticeable for high spherical powers. Additionally, the plus power of the fluid lens may be reduced at high gaze angles, consistent with visual needs of the wearer.

Toric Correction of the Front Lens

Additionally or alternatively, other aspheric corrections may be applied to front surface 118 of rigid lens 108. For example, surface 118 may be rendered toroidal. The astigmatism thereby added to front surface 118 of rigid lens 108 has at least two benefits. The astigmatism may be used to neutralize the natural astigmatism of the eye, possessed by about 80% of the population requiring vision correction. The astigmatism may also be used to neutralize the astigmatism generated on surface 104 of flexible membrane 110 when the shape of the fluid lens deviates from a circle.

Persons having natural astigmatism in their eyes typically wear astigmatic correcting eyeglasses to achieve best corrected vision. For this correction to be applicable, the direction of the astigmatic axis of the lens has to be orthogonal to the astigmatic axis of the eye of the wearer of the eyeglasses. If this astigmatic correction is provided by adding a toric curve to front surface 118 of rigid lens 108, then it is desired to make front toric rigid lenses 108 with the toric axis at all possible angles relative to the 0-180° line of rigid lens 108. This would constitute 180 different configurations, or skus. This is because the fluid lens assembly is not rotationally symmetrical, since it includes channel 112 attached to fluid lens 100. Additionally, it is desirable to substantially match the magnitude of the astigmatic correction added to front surface 118 of rigid lens 108 to the magnitude of the astigmatic correction required by the wearer. While the total range of magnitudes of natural astigmatism is very large (approximately 0 to approximately 15 diopters, or more), it is about 6 diopters (D) for 99% of the population requiring vision correction. Since the match between the natural astigmatism of the eye and the correcting astigmatism of the lens is required to be to the nearest 0.25 D, about 25 different configurations of the front surface are required to cover the range mentioned above. Also, the attachment of channel 114 to rigid lens 108 leads to a differentiation between left and right lenses, multiplying the total number of skus by a further factor of two. Therefore, 9,000 different configurations on front surface 118 of rigid lens 108 may be needed to provide correction to 99% of the population requiring vision correction.

In an embodiment of the present invention, it is possible to substantially reduce the number of skus on the front lens by designing a rotationally symmetrical lens blank that may be molded or machined in high volume. The desired lens shape may then be cut out to correspond to the desired shape of the fluid lens, and the membrane bonded to the outer edge of this shape that has been cut out. A hole may be drilled into the side of the rigid lens that has been cut out to provide a connection to the fluid path inside the channel. A small connector or a sleeve may connect the end of the channel to the hole.

Application of a toric correction to front surface 118 of rigid lens 108 of the fluid lens assembly also enables construction of fluid lenses that are non-round (e.g., oval or rectangular) in shape. Non-round fluid lenses have not been commercialized because a non-round fluid lens develops astigmatic error as the fluid lens is inflated to reach a higher plus power. This is because injection of fluid into a fluid lens causes an increase in hydrostatic pressure that is equal in all directions. This force causes the flexible membrane (such as membrane 110) of the fluid lens assembly to stretch or bulge outwards. Moreover, the force renders the surface of the membrane more convex and gives the fluid lens a higher plus power. In the case of a non-round fluid lens, the length of the meridians of the membrane are not equal in all directions. The curvature of the membrane is therefore different in different meridians, being steepest in the shortest meridian and least steep along the longest meridian. This leads to a toric shape. In an embodiment, it is possible to neutralize this inflation-induced astigmatism in the fluid lens by adding an astigmatic correction to the front surface of the rigid lens. In this approach, when the fluid lens is not inflated (i.e., when it is at its lowest plus power), the lens assembly has astigmatism corresponding to the astigmatism added to the front surface of the rigid lens. That is, when the fluid lens is not inflated, the astigmatism added to the front surface of the rigid lens is uncompensated by any inflation-induced astigmatism. Addition of astigmatism to front surface 118 of rigid lens 108 enables a trade-off between astigmatism at the lowest plus power and astigmatism at higher plus powers. This trade-off may be computed and optimized for the total designed range of powers of the fluid lens. Such a trade-off may also be acceptable to the wearer, provided that the astigmatism does not exceed the threshold of tolerance of astigmatism of the human eye at any point in the range or powers of the fluid lens.

In one exemplary embodiment, a fluid lens is designed according to the parameters shown in Table 1. The front surface of the fluid lens does not have any astigmatic correction in this embodiment.

TABLE 1

Specifications of a fluid lens embodiment

| | |
|---|---|
| Radius of curvature of the front surface of the rigid lens, $R_a$ | 500 mm |
| Radius of curvature of the back surface of the rigid lens, $R_b$ | 500 mm |
| Long diameter of the fluid lens, a | 35.0 mm |
| Short diameter of the fluid lens, b | 34.0 mm |
| Eccentricity, a/b | 0.972 |
| Range of fluid lens operation | 1.25 D to 3.25 D |
| Initial power along the long axis, $DI_a$ | 1.25 D |

TABLE 1-continued

Specifications of a fluid lens embodiment

| | |
|---|---|
| Initial power along the short axis, $DI_b$ | 1.26 D |
| Astigmatism in the initial state of the fluid lens | 0.01 D |
| Final power along the long axis of the fluid lens, $DF_a$ | 3.25 D |
| Final power along the short axis of the fluid lens, $DF_b$ | 3.37 D |
| Astigmatism in the final state of the fluid lens | 0.12 D |

In the fluid lens embodiment described in Table 1, the rigid lens is made of Polycarbonate of Bisphenol A, the membrane is biaxially oriented polyethylene terephthalate (trade name MYLAR), and the fluid is a silicone oil of refractive index 1.54. In this case, the degree of departure from the round shape is expressed as the eccentricity, and the shape becomes progressively more non-round as it departs father from 1.0. The data in Table 1 shows that the slight departure from a round shape has caused the development of a relatively low amount of astigmatism (0.12 D) at the highest point of the range, i.e., 3.25 D.

Figure 2:
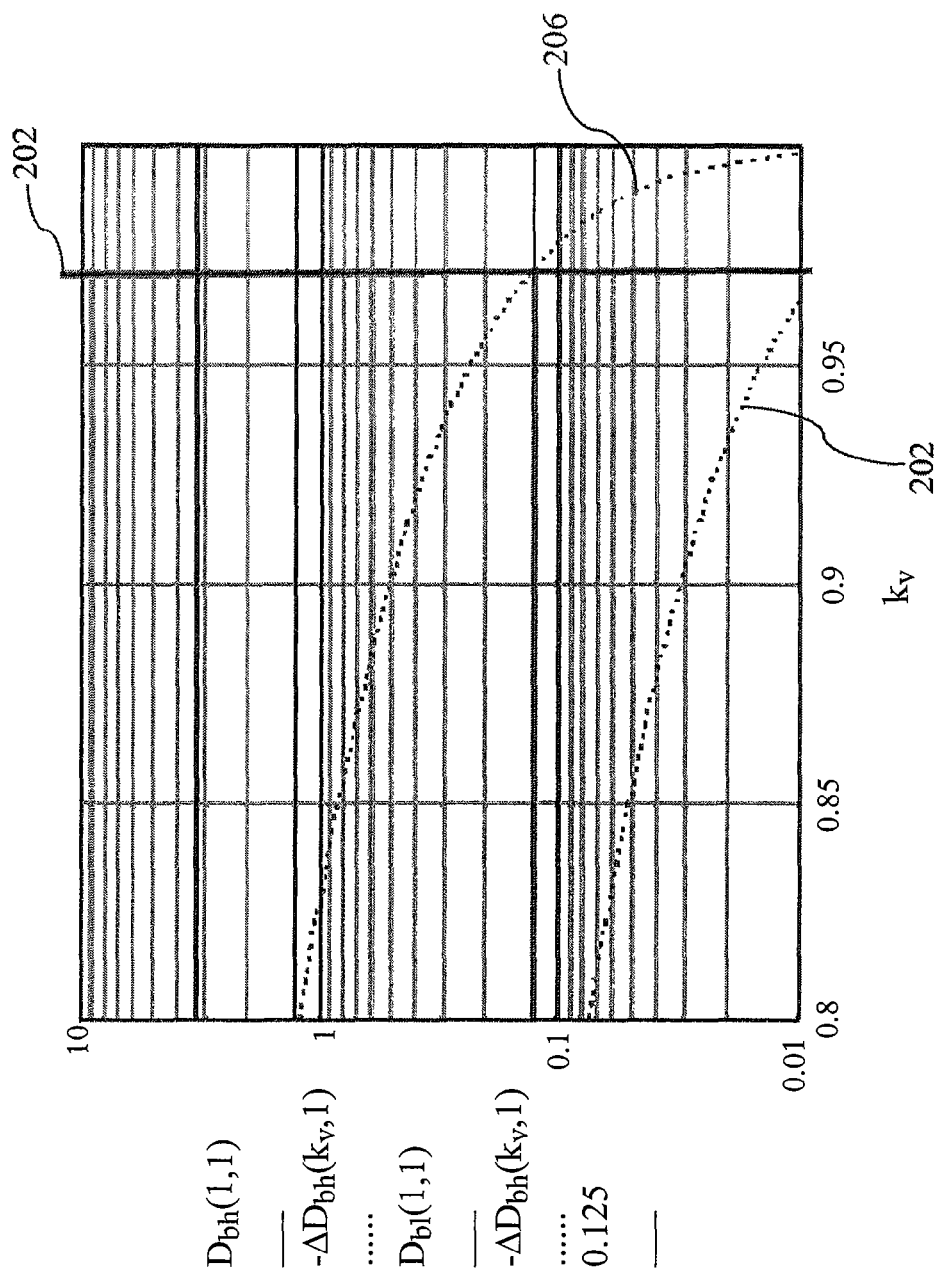
FIG. 2 shows the variation of astigmatism as a function of eccentricity in a fluid-filled lens assembly without correction to a front lens surface.

FIG. 2 shows the dependence of the buildup of astigmatism as a function of eccentricity in this fluid lens embodiment. The ordinate shows astigmatism in diopters (D), while eccentricity ($k_v$) has been plotted on the x axis. In FIG. 2, line 202 represents the fluid lens embodiment described in Table 1. Line 204 shows the values of astigmatism at the lowest point of the range (1.25 D), while line 206 represents the highest point of the range (3.25 D).

It is clear that for noticeably (that is, commercially useful) non-round geometries of the fluid lens, e.g., $k_v < 0.85$, the relatively small inflation required to reach the lowest point of the power range (1.25 D) leads to a small magnitude of astigmatism. This astigmatism is mostly below the level of perception of the human eye (typically 0.10-0.12 D). However, the induced astigmatism at the higher end of the power range reaches 0.85 D at $k_v = 0.85$, well above the range of tolerance of astigmatism by the human eye when engaged in near vision tasks, which is typically about 0.50 D at direct gaze (i.e., gaze angle of 0° and no more than 0.75 D over any part of the lens beyond gaze angle of 15°). FIG. 2 demonstrates the magnitude of the problem associated with non-round fluid lenses.

Figure 3:
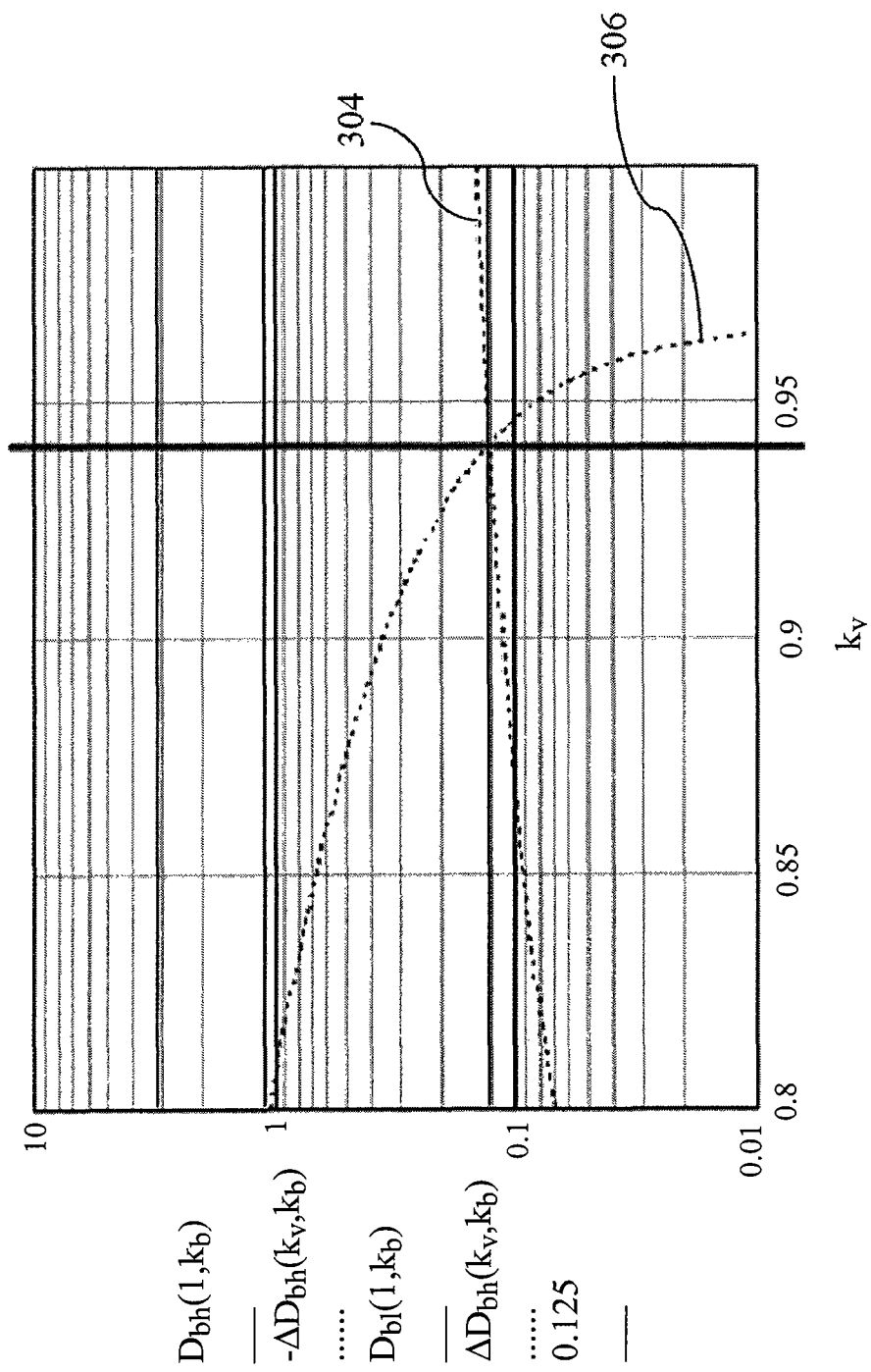
FIG. 3 shows the variation of astigmatism as a function of eccentricity in a fluid-filled lens assembly having a toric front lens surface correction, according to an embodiment of the present invention.

FIG. 3 shows the rate of development of astigmatism in the fluid lens embodiment specified in Table 1 with an added astigmatic correction (i.e., toric correction) of 0.125 D on the front surface of the rigid lens. Line 304, which represents the values of astigmatism at the lowest point of the range, reaches 0.125 D at an eccentricity of 1.0, in accord with the design intent. Line 306, which represents the values of astigmatism at the highest point of the range, reaches the value of 0.50 D at an eccentricity of 0.87. Interestingly, the astigmatism of the fluid lens remains constant at about 0.12 D over the whole range of powers at an eccentricity of 0.94. It is possible to reach non-round shapes of lower eccentricity by increasing the astigmatic correction of the front surface of the rigid lens. The maximum such correction should not exceed 0.18 D, consistent with visual comfort and image quality expected by wearers at the low end of the power range of the fluid lens assembly. This result shows that it is possible to design fluid lenses that are moderately non-round in shape with this approach.

Modification of the Flexible Membrane

A fluid lens, such as fluid lens 100, may be rendered aspheric by allowing the membrane, such as membrane 110, to inflate to adopt an aspheric (as opposed to spherical) shape. In an embodiment, an aspheric fluid lens uses a membrane of contoured thickness to form the fluid lens. A membrane of uniform thickness used to form a fluid lens assembly circular in shape inflates uniformly, thereby acquiring a spherical shape. The local deflection of the membrane is mainly controlled by the local rigidity of the membrane, and can be altered by stiffening the membrane or altering its thickness across the surface. A membrane of contoured thickness may therefore be used to form an aspheric fluid lens.

For example, if a rotationally-symmetric aspheric shape is required, the membrane should inflate into either an ellipsoidal or a hyperbolic shape. Such an inflation profile can be achieved by altering the thickness of the membrane in a radially symmetric manner. Any surface shape can be provided by an appropriate contour of thickness across the surface of the membrane, as could be determined by one of skill in the art.

Elastic membrane deformation is given by a superposition of elongation and bending. Stiffness in general is proportional to the modulus of elasticity. For the elongation part of deformation, it is also proportional to membrane thickness; the bending part is proportional to the thickness cubed. One method of adjusting stiffness involves adjusting thickness of the membrane along specific orientations. Thickness of the membrane may be altered by various methods, e.g., by a stretching process that is orientationally specific. Another method is to deposit a layer of a coating of variable thickness, such as through a plasma deposition process. As illustrated in FIGS. 5a,b and 6a,b, another method is to adhesively bond a second strip of membrane of appropriate thickness along a certain meridian of the membrane. Such approaches place a lesser limitation on the shape of the glasses containing the fluid lens apparatus, since any shape may be analyzed by a finite-element-based approach, the effective "long" and "short" axes identified, and then the thickness variation applied along those axes. Alternatively, a solution may be derived for stiffness as a function of x,y coordinates of the membrane, and this matrix of stiffnesses may be produced by deposition of a relatively stiff coating, such as silicon oxide (SiOx).

The design of a flexible membrane with location dependent stiffness may require computation of: the mechanical response of the membrane in an oval fluid lens, the surface geometry acquired by the membrane as a result of such deformation or stretching, and the optical power of a fluid lens that includes a membrane with the resulting shape, all as a function of the volume of fluid injected into the lens. Furthermore, a number of iterative computations may be performed in order to approximate as closely as possible the actual shape of the flexible membrane and the state of defocus of the retinal image produced by such an optic. In one example, these complex computations were performed using an exemplary software system. The exemplary software system combined several different software suites, each with a different function, in a way such that each piece of software inputs its results into the next system.

Figure 4:
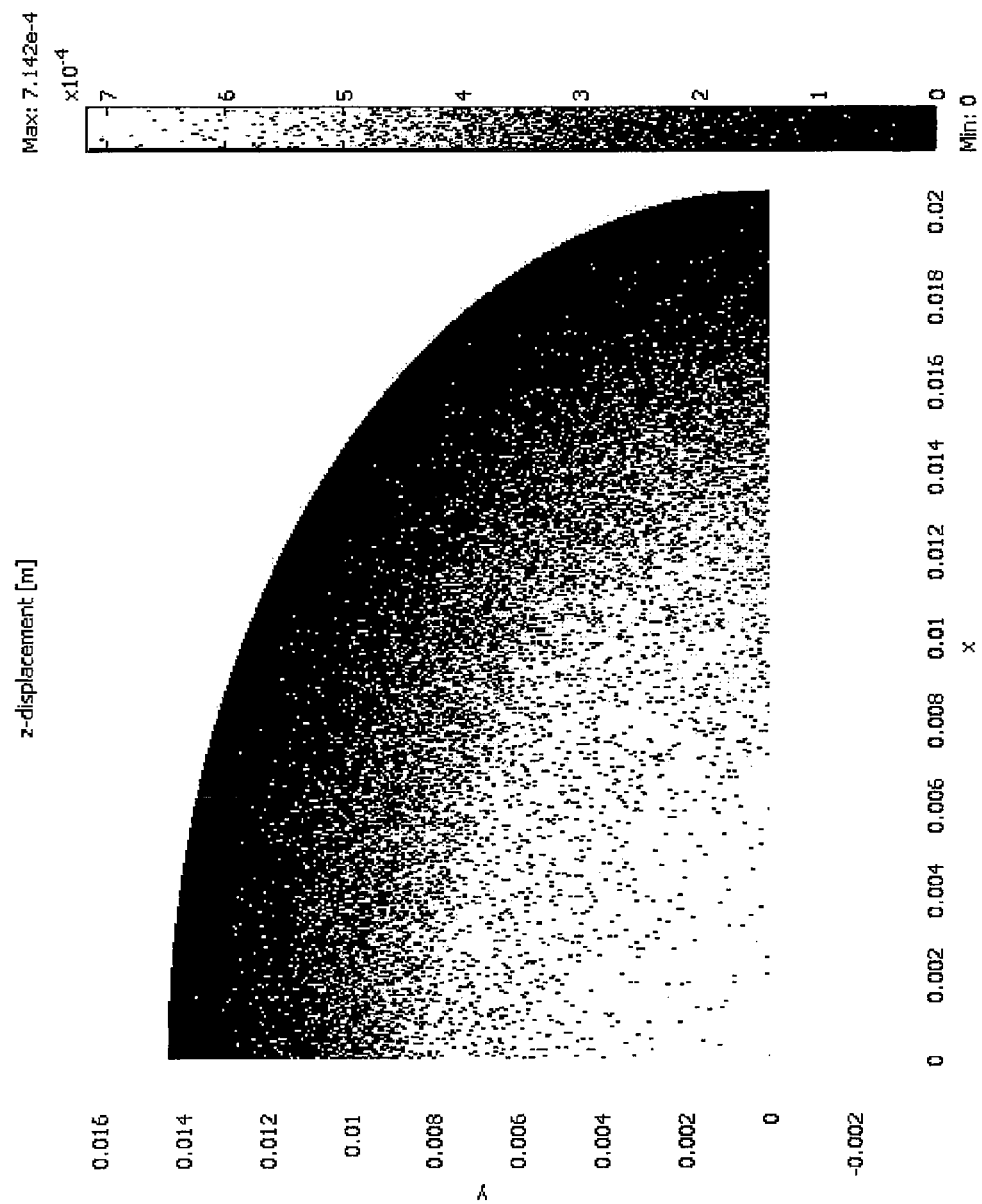
FIG. 4 illustrates deformation of a flexible membrane in a fluid lens, according to an embodiment of the present invention.
Figure 8B:
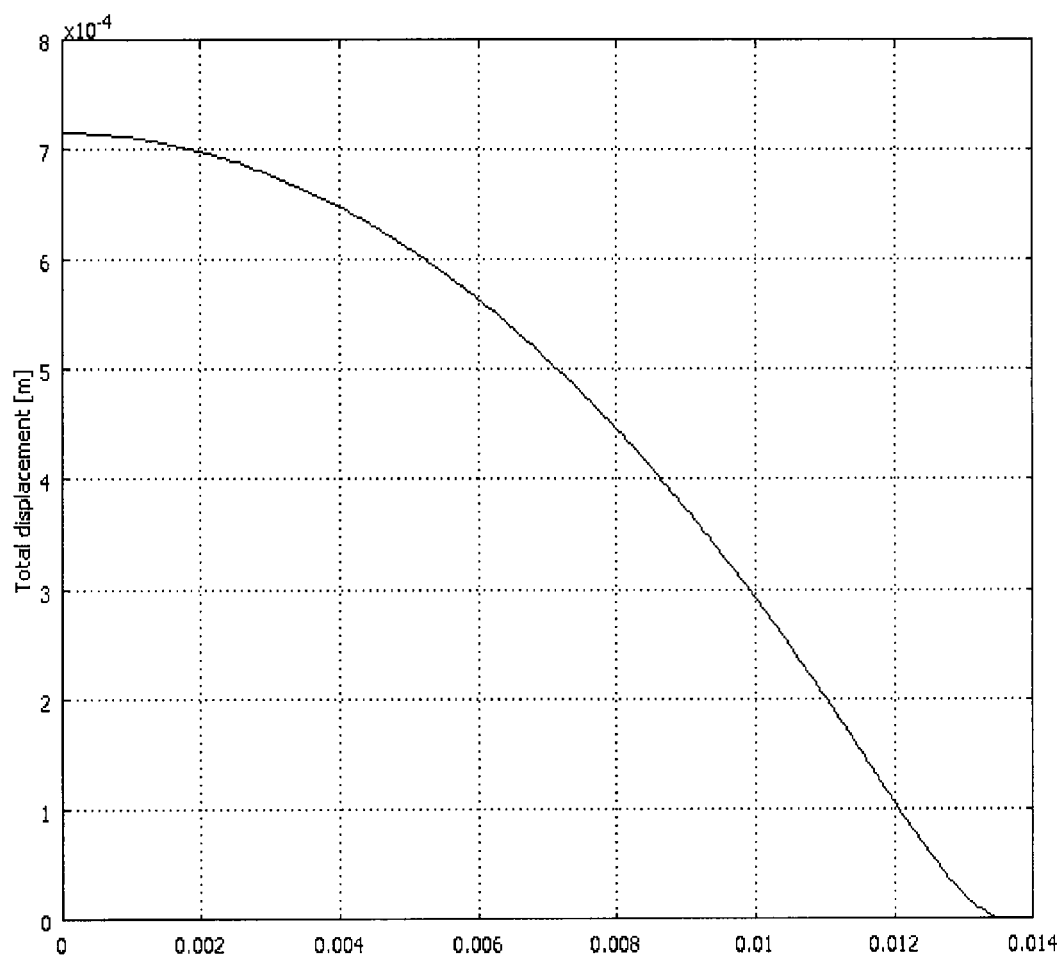

As an example only, the following suite was used in the computations described in exemplary embodiments herein. The deformation of the fluid membrane was modeled on COMSOL Multiphysics software, developed by COMSOL, Inc. of Burlington, Mass. The output of the COMSOL model was exported into MATLAB software, produced by The MathWorks, Inc. of Natick, Mass., in order to obtain a best fit polynomial for this surface. A second order polynomial (quadratic) was used in order to calculate the best combination of sphere and cylinder fit for this surface. This polynomial was then imported into ZEMAX optical modeling software, produced by ZEMAX Development Corporation of Bellevue, Wash. The deformation of the fluid membrane was calculated as a function of its x,y coordinates on COMSOL for an elliptical fluid lens in which the eccentricity was 0.8. The long diameter was 35 mm, while the short diameter was 28 mm. The model was run for a quadrant, taking advantage of the four-fold symmetry. FIG. 4 illustrates an exemplary deformation gradient of a flexible membrane in a fluid lens in front projection, as computed on the COMSOL software package according to these parameters. The contours shown in FIG. 4 demonstrate that the deformation was non-uniform throughout the membrane, reaching a peak of 0.7 mm (700 microns) for a pressure of 2000 Pascals. FIGS. 8a and 8b each represent a one-dimensional scan of the deformation shown in FIG. 4. FIG. 8a represents the deformation along the horizontal axis, and FIG. 8b represents the deformation along the vertical axis. Meshing was done in sweep mode (extra fine) in three layers to include the bending mode, generating 5439 elements in all. This data was exported into MATLAB for the best second order polynomial fit to be input into ZEMAX.

During the initial assessment of this computation scheme, it was observed that a coarser mesh size provided adequate accuracy and fidelity to the surface generated by the finer mesh size. Also, it was found that the cross terms could be neglected in the second order polynomial best fit computed on MATLAB, so that the surface could be adequately represented as a simpler biconic with quadratic terms in x and y, as shown in Eqs. 3 and 4. Eq. 3 is the Best Fit equation used by MATLAB to fit the deformation data exported from COMSOL.

biconic Zernike sag $$z_{bZ}(x,y) := \left[ \frac{\frac{x^2}{-R_x} + \frac{y^2}{-R_y}}{1 + \sqrt{1 - (1+k_x) \cdot \left(\frac{x}{R_x}\right)^2 - (1+k_y) \cdot \left(\frac{y}{R_y}\right)^2}} + \alpha_x \cdot x + \alpha_y \cdot y \right] \quad (Eq.\ 3)$$

Eq. 4 is Eq. 3 after ignoring x,y cross terms that provided a satisfactory fit to the deformation data. This equation was used to export surface deformation data into ZEMAX.

biconic sag $$z_b(x,y) := \frac{\frac{x^2}{-R_x} + \frac{y^2}{-R_y}}{1 + \sqrt{1 - (1+k_x) \cdot \left(\frac{x}{R_x}\right)^2 - (1+k_y) \cdot \left(\frac{y}{R_y}\right)^2}} \quad (Eq.\ 4)$$

This computational and modeling approach was used to evaluate different design concepts for a non-round fluid lens that could be adjusted in power over a diopter range of 2.0 D. The lower power was assumed to be 1.25 D and the higher power was taken as 3.25 D. A further assumption was that a maximum of 0.18 D of astigmatism may be allowed at the lower power, while a maximum of 0.50 D of astigmatism was allowable at the higher power.

In an embodiment, non-uniform thickness of the flexible membrane is provided in order to modulate and alter its deformation in response to fluid injection and consequent increase in spherical power. A flexible membrane of variable thickness may be obtained in several ways, as described above. In an embodiment, a tape or pad is used to alter the thickness over certain portions of the membrane surface. Such tapes or pads may be cut out of the same polymer film as that used to fabricate the flexible membrane, and then be bonded to the flexible membrane. For example, the tapes or pads may be bonded to the inner surface of the flexible membrane, in contact with the fluid (e.g., oil) in order to minimize the visibility of the tapes or pads. The bonding of these tapes or pads to the membrane may be accomplished using an adhesive. In an embodiment, the adhesive has a refractive index approximately equal to the refractive index of the fluid. Alternatively, the tapes or pads may be bonded to the flexible membrane by laser welding or ultrasonic welding, or other means as would be known to those of skill in the art. One or more such tapes or pads may be used for this purpose. In an embodiment, tapes and pads are not used to add thickness to the flexible membrane; rather, differences in thickness are integral to a single flexible membrane sheet. Techniques for creating a flexible membrane of varying thickness include, for example and without limitation, molding, compression molding, thermal forming, and laser ablation.

Figure 5B:
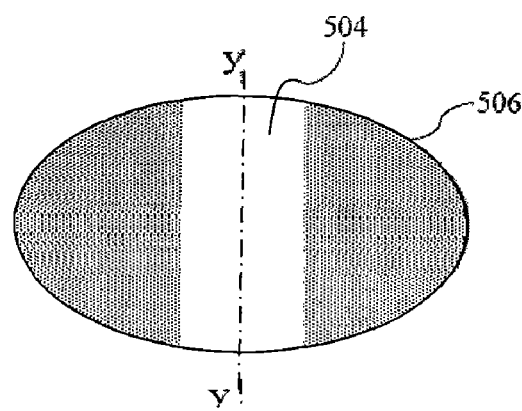
Figure 6A:
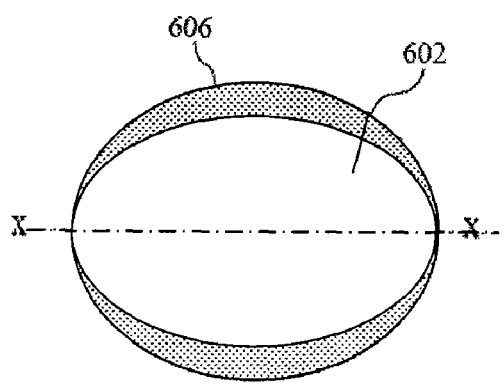
Figure 6B:
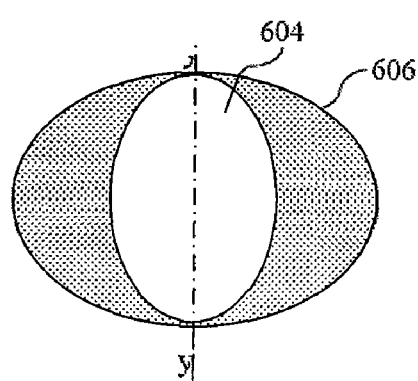

FIGS. 5a,b and 6a,b illustrate exemplary designs of tapes and pads modeled to deduce the optimum shape and contours so as to modulate the stiffness of the membrane. FIGS. 5a and 5b illustrate tapes 502, 504 applied along x and y axes, respectively, of a flexible membrane 506. FIGS. 6a and 6b illustrate pads 602, 604 applied along x and y axes, respectively, of a flexible membrane 606.

Table 2 shows the results of analysis of the exemplary designs shown in FIGS. 5a,b and 6a,b, comparing the application of a tape or a pad (referred to in Table 2 as a reinforcing piece) along x and y axes. In the exemplary model used in Table 2, the thickness of the reinforcing piece (e.g., tape or pad) was the same as that of the flexible membrane itself. That is, the thickness was doubled where reinforcement was applied. The final analysis was performed on ZEMAX software that was used to compute the astigmatism over the entire range of spherical powers, as well as the image spot size along x and y axes. In this analysis, the eccentricity as been assumed to be 0.864, the optic being 35 mm along the long axis (x axis) and 30.25 mm along the short axis (y axis). The lowest optical power is 1.25 D and the highest optical power is 3.25 D. The front surface of the rigid lens has been provided with a toric correction such that the net astigmatism at the lowest power (1.25 D) is 0.18 D in all cases. Spot size along the x axis is when focused for x; spot size along the y axis is when focused for y.

TABLE 2

Modeling of reinforcing piece on flexible membrane in an elliptical fluid lens

| Reinforcing Piece | Astigmatism at 3.25 D | Spot size along x axis, Microns | Spot size along y axis, Microns |
|---|---|---|---|
| None | 0.73 D | 10.1 | 14.2 |
| Pad along x axis (FIG. 5a) | 0.61 D | 9.9 | 13.2 |
| Pad along y axis (FIG. 5b) | 1.02 D | 10.6 | 16.9 |
| Tape along x axis (FIG. 4a) | 0.51 D | 9.7 | 12.5 |
| Tape along y axis (FIG. 4b) | 1.04 D | 10.4 | 17.0 |

Next, the effect of increasing reinforcement was examined as a function of eccentricity. Table 3 shows the rate of build-up of astigmatism as the thickness of the reinforcing means was increased in an exemplary model. In this exemplary analysis, the eccentricity was assumed to be 0.864, with the long diameter being 35.0 mm. The lowest and the highest spherical powers were assumed to be 1.25 D and 3.25 D, respectively, with the range of adjustment being 2.0 D. It was also assumed that the front surface of the rigid optic was provided with toric correction along the appropriate axis, so that the net astigmatism at the lowest power is held at 0.18 D. Astigmatism at the highest spherical power was computed on ZEMAX, along with the spot size of the image. The base membrane was assumed to be of unit thickness, so that a reinforcing piece of 1× thickness doubles the thickness of the membrane where it was applied. It is expected that the spot size of the image would be correlated with the point spread function of the retinal image, a critical measure of the crispness and clarity of the retinal image, and a measure of the image quality perceived by the wearer. In the example shown in Table 3, there was an improvement in image quality as the thickness of the reinforcement was increased in the fluid lens.

TABLE 3

Change in astigmatism as a function of reinforcement thickness

| Reinforcing Piece | Max Astigmatism at 3.25 D | Spot size along x axis, Microns | Spot size along y axis, Microns |
|---|---|---|---|
| None | 0.73 D | 10.1 | 14.2 |
| Pad 1X | 0.61 D | 9.5 | 13.2 |
| Pad 2X | 0.37 D | 7.5 | 9.4 |
| Pad 3X | 0.14 D | 7.4 | 8.0 |
| Tape 1X | 0.51 D | 9.7 | 12.5 |
| Tape 2X | 0.35 D | 9.5 | 11.4 |
| Tape 3X | 0.17 D | 9.2 | 10.2 |

It was found in this example that the 3× reinforcement enabled the use of a non-round optic up to eccentricities of 0.80 while staying within the limits of astigmatism specified for the lowest and the highest spherical powers (sph) (e.g., 0.18 D at 1.25 sph and 0.50 D at 3.25 D sph). This level of eccentricity is adequate for most lens designs, since it provides a long axis diameter of 40 mm for a short axis diameter of 32 mm. Further departures from the round shape (e.g., an eccentricity of 0.7) can be achieved by enhancing the reinforcement further, for example by using a pad or a tape that is 4×-6× in thickness.

It should be noted that the analysis and results presented above addressed an exemplary paraxial situation assuming a pupil size of 4.0 mm. In other words, it was applicable to the center of the optic over a moderate field angle, less than 10 degrees. This analysis may be repeated at different gaze angles for the whole optic. Such a computation would further optimize the shape of the membrane, since it would be possible to prescribe reinforcing schemes that provide the best correction for the whole optic, rather than providing the best correction at the optical center. In performing this global optimization, it may be recognized that the optical segments far from the center are not as important in determining overall visual satisfaction as the center of the optic, since most viewing tasks require direct gaze with controlled eye movements that supplement head movements for the most comfortable near-vision experience.

Other shaped optics, such as rectangular- or square-shaped optics, may also be adapted to this approach. The shape of the deformed membrane may be described, for example, as a collection of points such as a point cloud, or a collection of splines used to fit the points. In this case, the wavefront of rays transmitted through the liquid lens (including the deformed membrane) is computed, and an adaptive correction may be applied to the wavefront to maximize the retinal image quality. The retinal image quality may be measured by one of the several commonly-used metrics of image quality, such as the Strehl ratio or the equivalent defocus.

Fluid Lens Inset

Figure 7B:
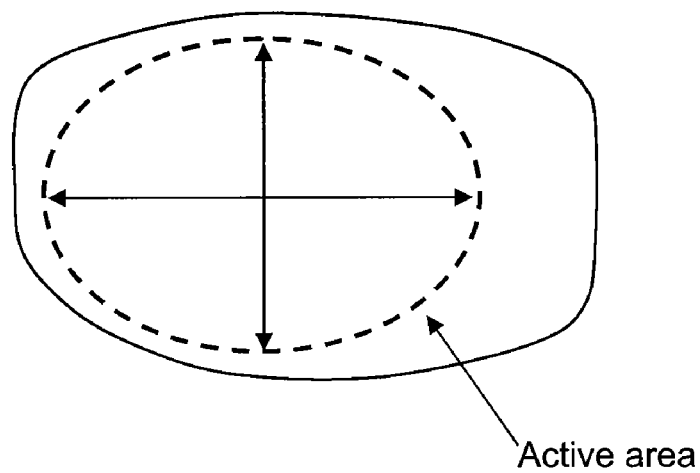

In an inset-type design embodiment, the non-round shape of the fluid lens includes a round or elliptical section centered at the location of the pupil of the wearer. In such an embodiment, upon putting on the glasses, the center of the pupil lines up with the center of the inset. With a circular inset, the active region may be small depending on the shape of the lens frame, because the vertical diameter of the circular shape must fit within the vertical diameter of the frame. If the active region of the flexible membrane is too small, it may be unsuitable for a wearer as the eye movement of a wearer may need a larger viewing range side-to-side than up-to-down. For example, an average wearer needs an active area width of about 30-35 mm for comfortable side-to-side eye movement. An elliptical inset portion allows for such an active area width, even when the vertical dimension of the inset is small compared to the active area width. FIG. 7a,b illustrate an exemplary elliptical inset 702 in a fluid lens assembly 704. The inset optic 702 is referred to herein as the active optical region. The active optical region is designed to inflate to deliver the desired power range. The specifications of astigmatism at the low and high end of the power range apply to the active region only. The active region may be developed by contouring the thickness of the membrane to be substantially thinner than in the surrounding optical region. For example, as shown in exemplary elliptical inset 702 of FIG. 7b, it was found that for an active region of 25 mm×35 mm, an eccentricity of 0.80 met the optical specifications mentioned above over a power range of 1.50 D, from 1.25 D to 2.75 D. A membrane thickness ratio of 2× to 10× may be used provide this segmentation of the overall optical area. In an embodiment, the membrane thickness ratio is 3× to 7×. The smaller the thickness ratio, the more deflection is experienced by the outer zone. This leads to a higher level of astigmatism in the active zone.

For such a design to be cosmetically acceptable, the border of the active optical region may be smoothly blended, so that image jump or perceivable image distortions are avoided. It is found that the main causes of the visual discomfort associated with this border are: (1) prism discontinuity; (2) magnification discontinuity; and (3) high localized astigmatism, caused by power discontinuity. These are also the main factors that contribute to the visibility of this border, potentially leading to a cosmetically unacceptable outcome. These problems may be minimized by providing a transition zone. In an embodiment, the transition zone is approximately 1-5 mm in width. In a further embodiment, the transition zone is approximately 2-3 mm in width. The width of the transition zone may be determined by the gradient in power within this zone, since visual performance of this zone may be acceptable, for example, only for a power gradient of 0.50 D/mm or less, leading to a maximum value of astigmatism of 0.50 D at this zone. In such an example, a power range of 1.50 D requires a transition zone of 3.0 mm in width.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A fluid lens assembly, comprising:
   a non-round rigid lens having a back surface and an aspheric front surface;
   a flexible membrane coupled to the back surface of the non-round rigid lens, such that a cavity is formed between a front surface of the flexible membrane and the back surface of the rigid lens; and
   a reservoir in fluid communication with the cavity between the front surface of the flexible membrane and the back surface of the non-round rigid lens, such that a fluid is transferable between the reservoir and the cavity to change the optical power of the fluid lens assembly,
   wherein the aspheric front surface at least partially reduces an optical error caused by fluid located in the cavity.

2. The fluid lens assembly of claim 1, wherein the back surface of the non-round rigid lens is spherical.

3. The fluid lens assembly of claim 1, wherein a transfer of fluid between the reservoir and the cavity causes the flexible membrane to change shape aspherically.

4. The fluid lens assembly of claim 3, wherein the aspheric front surface of the rigid lens substantially counteracts an astigmatism caused by deformation of the flexible membrane.

5. The fluid lens assembly of claim 1, wherein the flexible membrane is uniform in thickness.

6. The fluid lens assembly of claim 1, wherein the flexible membrane is not uniform in thickness.

7. The fluid lens assembly of claim 6, wherein the thickness of the flexible membrane is contoured so as to cause the flexible membrane to change shape spherically when fluid is transferred between the reservoir and the cavity.

8. The fluid lens assembly of claim 1, wherein an astigmatism introduced by the aspheric front surface when a viewer is engaged in a near vision task is less than 0.5 diopters at direct gaze.

9. The fluid lens assembly of claim 1, wherein the front surface of the rigid lens is toric.

* * * * *